(12) United States Patent
Gupta et al.

(10) Patent No.: US 11,816,437 B2
(45) Date of Patent: Nov. 14, 2023

(54) AUTOMATICAL PROCESS APPLICATION GENERATION

(71) Applicant: INTERNATIONAL BUSINESS MACHINES CORPORATION, Armonk, NY (US)

(72) Inventors: Ajay Gupta, New Delhi (IN); Arvind Agarwal, New Delhi (IN); Harshit Kumar, New Delhi (IN); Balaji Viswanathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 17/122,644

(22) Filed: Dec. 15, 2020

(65) Prior Publication Data

US 2022/0188522 A1    Jun. 16, 2022

(51) Int. Cl.
| | | |
|---|---|---|
| *G06F 40/00* | (2020.01) | |
| *G06F 40/30* | (2020.01) | |
| *G06F 40/279* | (2020.01) | |
| *G06F 16/35* | (2019.01) | |
| *G06F 40/186* | (2020.01) | |
| *G06V 30/412* | (2022.01) | |

(52) U.S. Cl.
CPC .............. *G06F 40/30* (2020.01); *G06F 16/35* (2019.01); *G06F 40/186* (2020.01); *G06F 40/279* (2020.01); *G06V 30/412* (2022.01)

(58) Field of Classification Search
CPC ....... G06F 40/30; G06F 40/279; G06F 40/186
See application file for complete search history.

(56) References Cited

U.S. PATENT DOCUMENTS

| | | | | |
|---|---|---|---|---|
| 9,275,042 B2* | 3/2016 | Larcheveque | ...... | G06F 16/3329 |
| 10,229,100 B1 | 3/2019 | Lesner | | |
| 10,930,272 B1* | 2/2021 | Orkin | ...................... | G06N 20/00 |
| 11,200,886 B2* | 12/2021 | Chatterjee | ........... | G10L 15/1822 |
| 11,361,164 B2* | 6/2022 | Oddy | ..................... | G06N 20/00 |
| 11,610,064 B2* | 3/2023 | Yu | ......................... | G06F 16/285 |
| 2014/0173405 A1* | 6/2014 | Ferrara | ................. | G06F 16/972 |
| | | | | 715/223 |
| 2017/0097966 A1* | 4/2017 | Kozareva | ............... | G06Q 30/02 |
| 2017/0116982 A1* | 4/2017 | Gelfenbeyn | ........ | G10L 15/1815 |
| 2017/0192953 A1* | 7/2017 | Miklos | ............... | G06F 16/9024 |
| 2017/0242899 A1 | 8/2017 | Jolley | | |
| 2017/0249592 A1 | 8/2017 | Rossi | | |
| 2018/0052884 A1 | 2/2018 | Kale | | |
| 2018/0121062 A1* | 5/2018 | Beaver | .................... | G06F 40/30 |

(Continued)

OTHER PUBLICATIONS

Open Intent Extraction from Natural Language Interactions, Vedula eta., 12 pages, Apr. 2020 (Year: 2020).*

(Continued)

*Primary Examiner* — Scott T Baderman
*Assistant Examiner* — Barbara M Level
(74) *Attorney, Agent, or Firm* — Teddi E. Maranzano

(57) ABSTRACT

A computer-implemented method gathers a set of previously filed applications, performs intent identification on the set, clusters applications in the set based on identified common intents, receives input from user and identifying intent of the input, matches the input to a cluster based on a common intent, and generates a new application based on the input using filed applications in a cluster having a common intent between the cluster and the input.

3 Claims, 16 Drawing Sheets

(56) References Cited

U.S. PATENT DOCUMENTS

| | | | |
|---|---|---|---|
| 2019/0034429 A1* | 1/2019 | Das | G06N 5/04 |
| 2019/0124020 A1* | 4/2019 | Bobbarjung | G06F 16/958 |
| 2019/0147029 A1* | 5/2019 | Chiu | G06F 40/30 |
| | | | 715/226 |
| 2019/0236137 A1* | 8/2019 | Hesketh | G06F 16/957 |
| 2019/0251417 A1* | 8/2019 | Bennett | G06F 40/00 |
| 2019/0347319 A1* | 11/2019 | Goyal | G10L 15/32 |
| 2020/0012721 A1* | 1/2020 | Pasupalak | G06F 40/295 |
| 2020/0035229 A1* | 1/2020 | Solanki | G06F 16/3329 |
| 2020/0104653 A1* | 4/2020 | Solomon | G06K 9/6296 |
| 2020/0111377 A1* | 4/2020 | Truong | H04M 3/5175 |
| 2020/0175078 A1* | 6/2020 | Gueta | G06F 16/90332 |
| 2020/0211541 A1* | 7/2020 | Gupta | G10L 15/1815 |
| 2020/0311210 A1* | 10/2020 | Nama | G06F 40/289 |
| 2020/0344375 A1* | 10/2020 | Ishii | H04L 51/02 |
| 2021/0044546 A1* | 2/2021 | Taslimi | G10L 15/1822 |
| 2021/0081615 A1* | 3/2021 | McRitchie | G06F 40/247 |
| 2021/0103634 A1* | 4/2021 | Gkikas | G06F 40/211 |
| 2021/0278941 A1* | 9/2021 | Yue | G06F 40/216 |
| 2022/0101834 A1* | 3/2022 | Chen | G10L 15/1822 |

OTHER PUBLICATIONS

Query Intent Detection using Convolutional Neural Networks, Hashemi et al., 5 pages, 2016 (Year: 2016).*
Mell et al., "The NIST Definition of Cloud Computing", Recommendations of the National Institute of Standards and Technology, NIST Special Publication 800-145, Sep. 2011, 7 pages.

* cited by examiner

AUTOMATICAL PROCESS APPLICATION GENERATION

BACKGROUND

Embodiments of the invention generally relate to artificial intelligence, and more particularly to machine learning and natural language processing.

In the information technology field, users and organizations are always exchanging information in structured and unstructured formats. In one such type of engagement, a user submits a process application; a set of forms and data fields that collect information for a specific purpose. The application is completed by an applicant and is received by a recipient. The specific purpose may be to enable the recipient to perform a specific task based on the applicant's information. New purposes and tasks are always developing to meet demand for new engagements.

For example, consider two persons whose names appear on a car lease, and where at least one of the two persons should be removed from the lease. This may be accomplished by one of the two persons, i.e. an applicant, submitting an application to a financing company, i.e., a recipient, that owns the lease. This may be a new engagement for which no process application or form exists.

The manner in which such a process application can be developed and deployed is non-trivial and presents unique technological challenges requiring a novel and non-obvious solution.

SUMMARY

Embodiments of the invention provide for methods, computer program products, and systems for generating process applications via one or more electronic information intake forms. An embodiment of the invention receives, via a graphical user interface (GUI), a user request to perform an action, the user request comprising a natural language statement. The embodiment performs user intent identification on the natural language statement of the user request. The embodiment determines, based on the user intent identification, that there is no exact match between an intent of the user and intents of existing information intake forms stored in a corpus. The embodiment generates a new information intake form using one or more data fields of an existing information intake form stored in the corpus.

DETAILED DESCRIPTION

Figure 1:
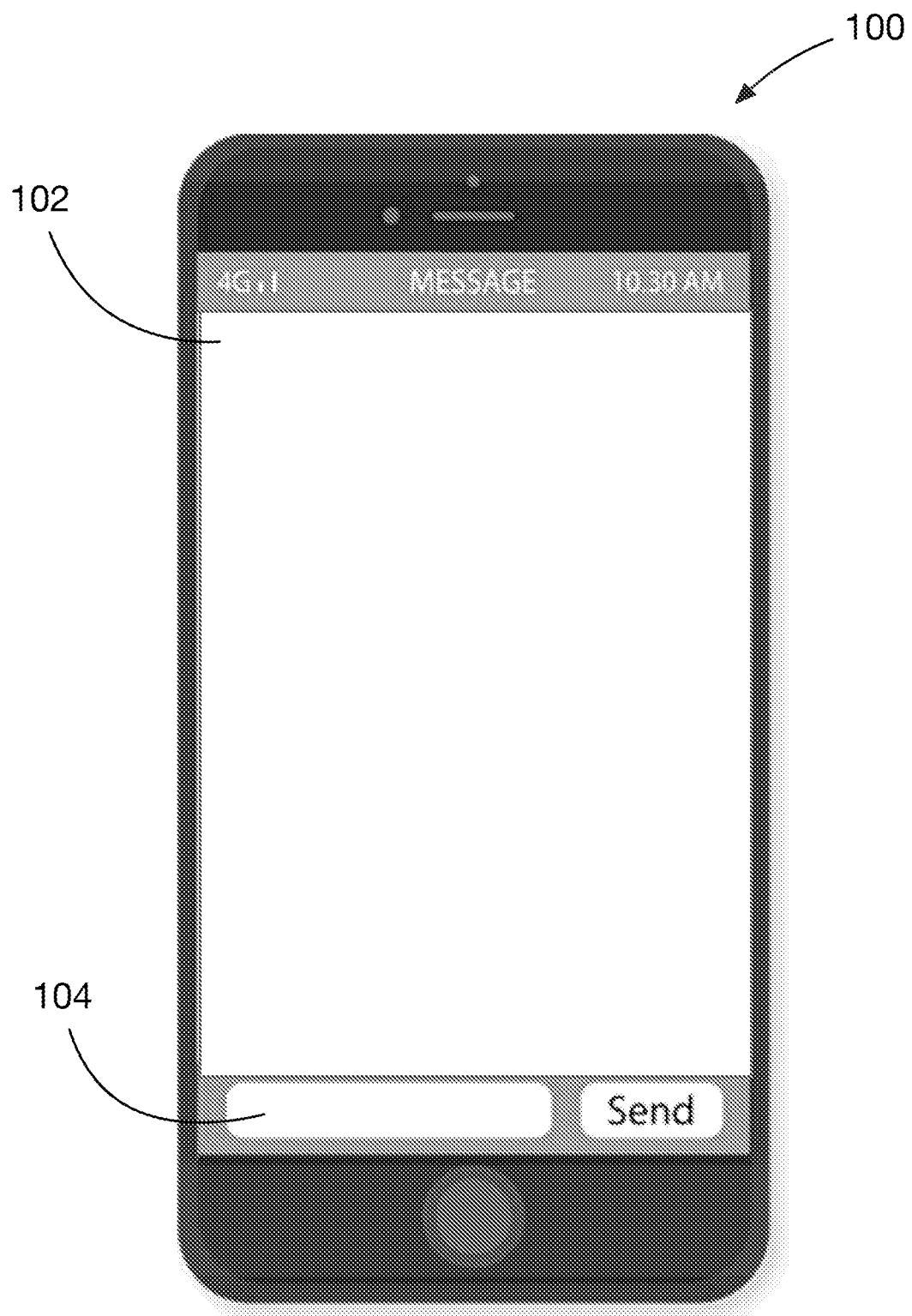
FIGS. 1-9 are an illustrative GUIs for stages of input/output of a software application according to embodiments of the invention.

Continuing with the example above, two persons whose names appear on a car lease intend to perform the task of removing at least one of the two persons from the lease. Accomplishing this task may require submitting a process application to a financing institution that owns the car and/or manages the car lease. If the financing institution has not already created a process application for this purpose, the financing institution will need to allocate resources (such as human, computing, and financial resources) to create a new process application that collects the necessary information from applicants. The process application may be created for electronic access via a form on the Internet, on a mobile or desktop device, or via another mechanism.

In this context, a task of interest may be to generate, by a computer, a process application for use by a user (applicant) to accomplish the user's intent. In the above example, the task of interest may be to generate a process application to remove a person's name from a car lease. In an embodiment of the invention, the task of interest may be executed by providing and executing programming instructions of a computer application to generate an electronic form and to collect information from structured and unstructured data sources; dynamically, if needed.

The discussion of embodiments of the invention may refer to the words "process application", "form", and "computer application". It shall be apparent to a person of ordinary skill in the art that, unless otherwise specified, "process application" and "form" refer to electronic representation of data fields or electronic interfaces for electronic information collection; i.e., means for collecting electronic data from a user. These process applications and forms may be generated and used electronically, or generated electronically and used in hard-copy format based on the electronically generated versions thereof. The term "computer application" refers to a set of programming instructions that when executed by a processor, generates a process application or form.

Embodiments of the invention address the tedious and laborious nature of creating a new process application, by exploiting previously filled forms and any information already available about users. The result include a reliable, more standardized, and automated application generation process.

There is currently no known computer system or platform for process application generation that exploits previously-filled electronic forms or information about a user wishing to engage with a given business process.

It shall be apparent to a person of ordinary skill in the art that reference to process applications define examples of some computer applications that can be developed using embodiments of the invention. Applicant's invention, in all embodiments, is directed to patent eligible subject matter including processes and methods, computer program products, and systems; does not recite non-patent eligible subject matter; and firmly grounds all inventive ideas in a practical application that constitutes an improvement to the art of application or form generation.

According to some embodiments of the invention, application collection and learning models (for intent and template identification) are provided. Previously-filled electronic forms (including both structured and unstructured data) are processed and clustered based on their content. For each cluster, an intent of the applications in the cluster and representative applications in the cluster may be identified. The representative application may serve as a template application.

Some embodiments of the invention provide for entity identification, where in each application cluster, entities for which information from a user are required are determined with the help of the cluster information. For example, for an application intended to change the name of a user of a bank account in a banking application, one or more similar applications may use the same or similar information; such as bank account number or routing number.

In some embodiments of the invention, a function of automatic information completion is provided. For some information used in an application, a context of the application may be used to generate the information and to fill a corresponding electronic form. For example, if a user of a banking application needs a bank branch name, the user's mobile location information may be detected and populated automatically inside an electronic form.

In some embodiments of the invention, a dialogue-based approach to information gathering may be used. For example, for any information that cannot be automatically filled in, a user dialogue system may be initiated to ask the user specific questions to prompt the user for specific answers or to provide natural language text statements that can be used in other aspects of the invention.

FIGS. 1-9 provide an illustrative series of graphical user interfaces (GUI) 100 displayable to a user of a mobile device (hereinafter, "GUI 100"), according to embodiments of the invention.

As shown in FIG. 1, GUI 100 illustrates the interface of a mobile application (a computer application) that can collect information needed for a process application to remove a user's name from a car lease. GUI 100 provides a user (who may be the same as or different from the user to be removed) a message in message field 102, which reads, "write an application for . . . ", and provides the user with a text input field 104. The user types "remove [person]'s name from car lease", where "[person]" refers to any name specified by the user, and presses a "send" button.

Figure 2:
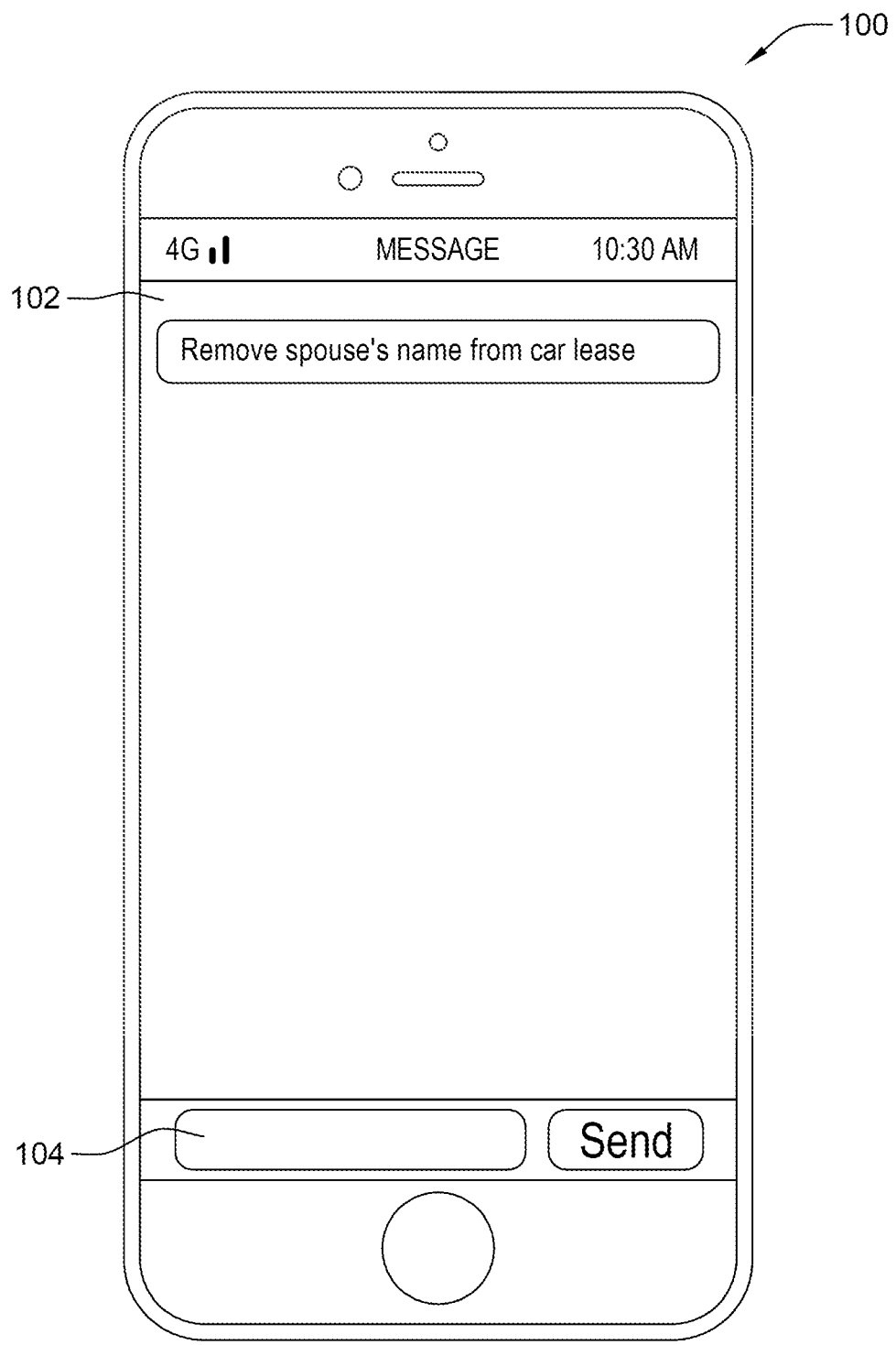

As shown in FIG. 2, GUI 100 displays, in message field 102, the text written by the user in text field 104 and submitted, for example, by pressing the send button. This confirms that the system has received initial content from the user. This initial content defines the intent, purpose, or task of interest that the user or applicant wishes to perform and for which the system must generate a process application for which an exact match does not currently does exist or is not readily identifiable.

Figure 3:
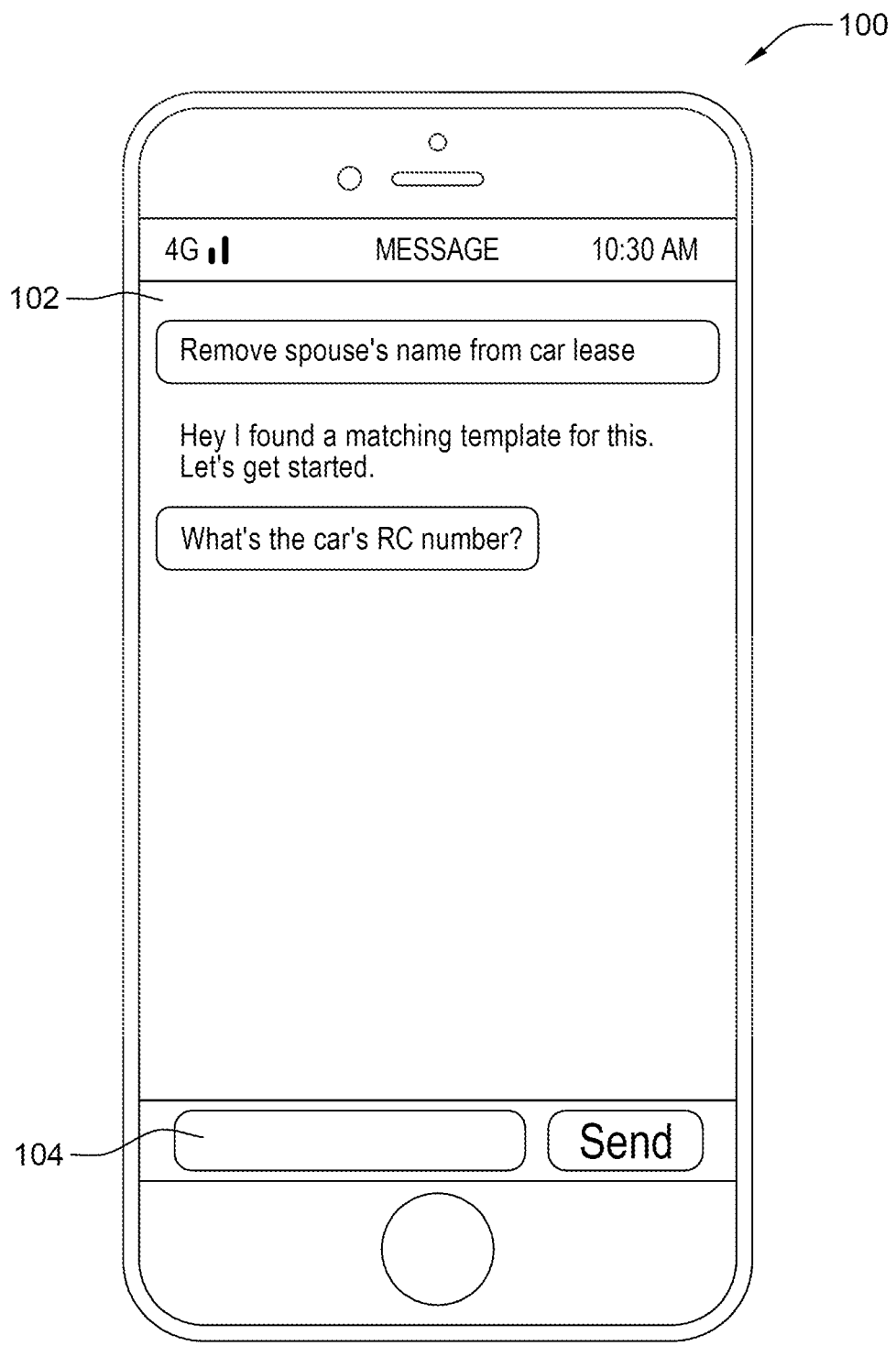

As shown in FIG. 3, GUI 100 displays, in message field 102, a message history as well as information indicating a match with a process application template; for example, the message "Hey, I found a matching template for this. Let's get started", along with a question that prompts the user for input; for example, "What's the car's RC number". The information about an "RC number" (i.e., a vehicle identification number) and that it may be helpful in accomplishing the user's desired task of interest, is determined via embodiments of the invention as described in connection with other figures. The user types an answer in response to the question.

Figure 4:
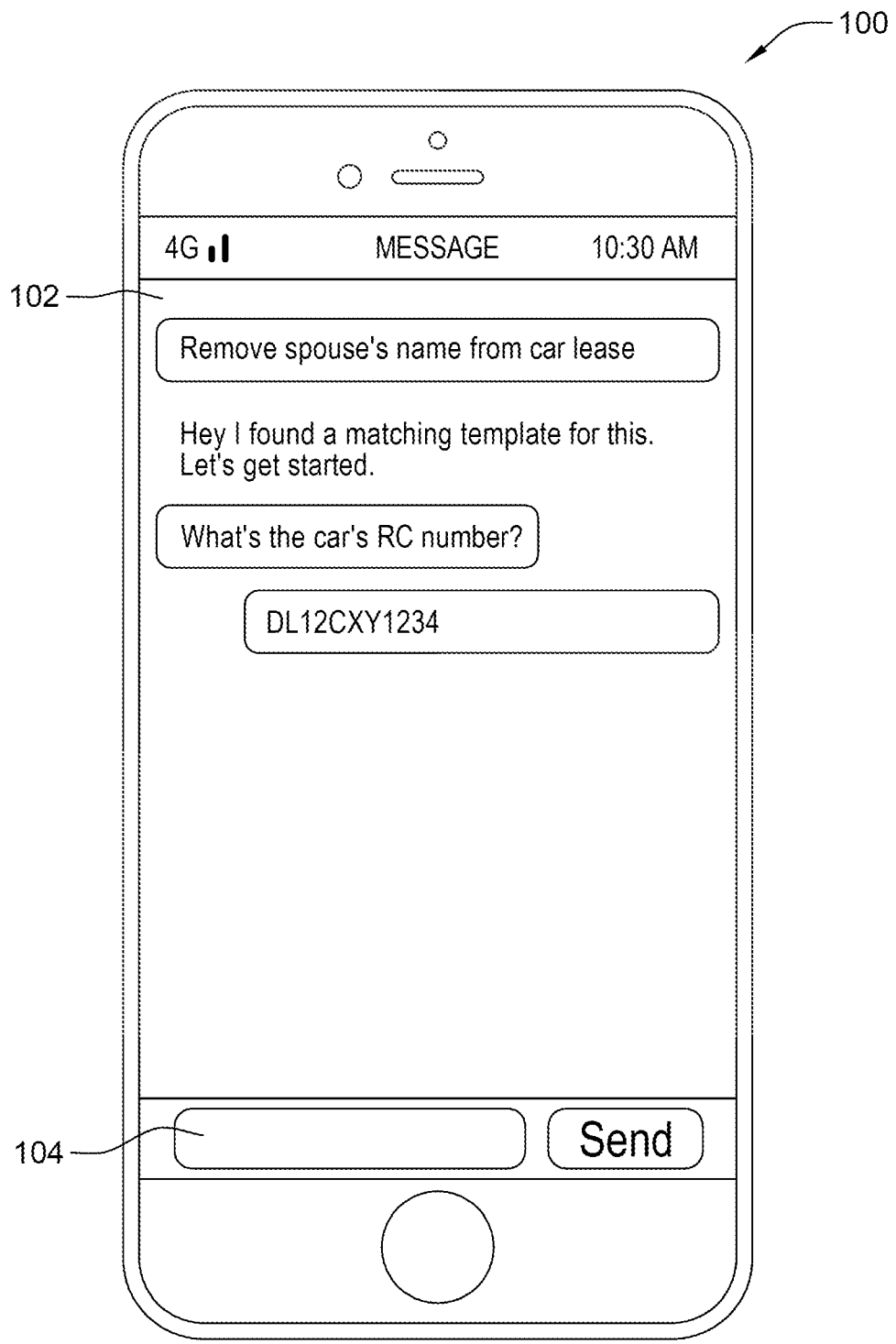

As shown in FIG. 4, GUI 100 displays, in message field 102, a message history as well as information indicating that the user entered the text "DL12XCY1234" into input field 104 and pressed "send", indicating the car's RC number, in response to a prompt.

Figure 5:
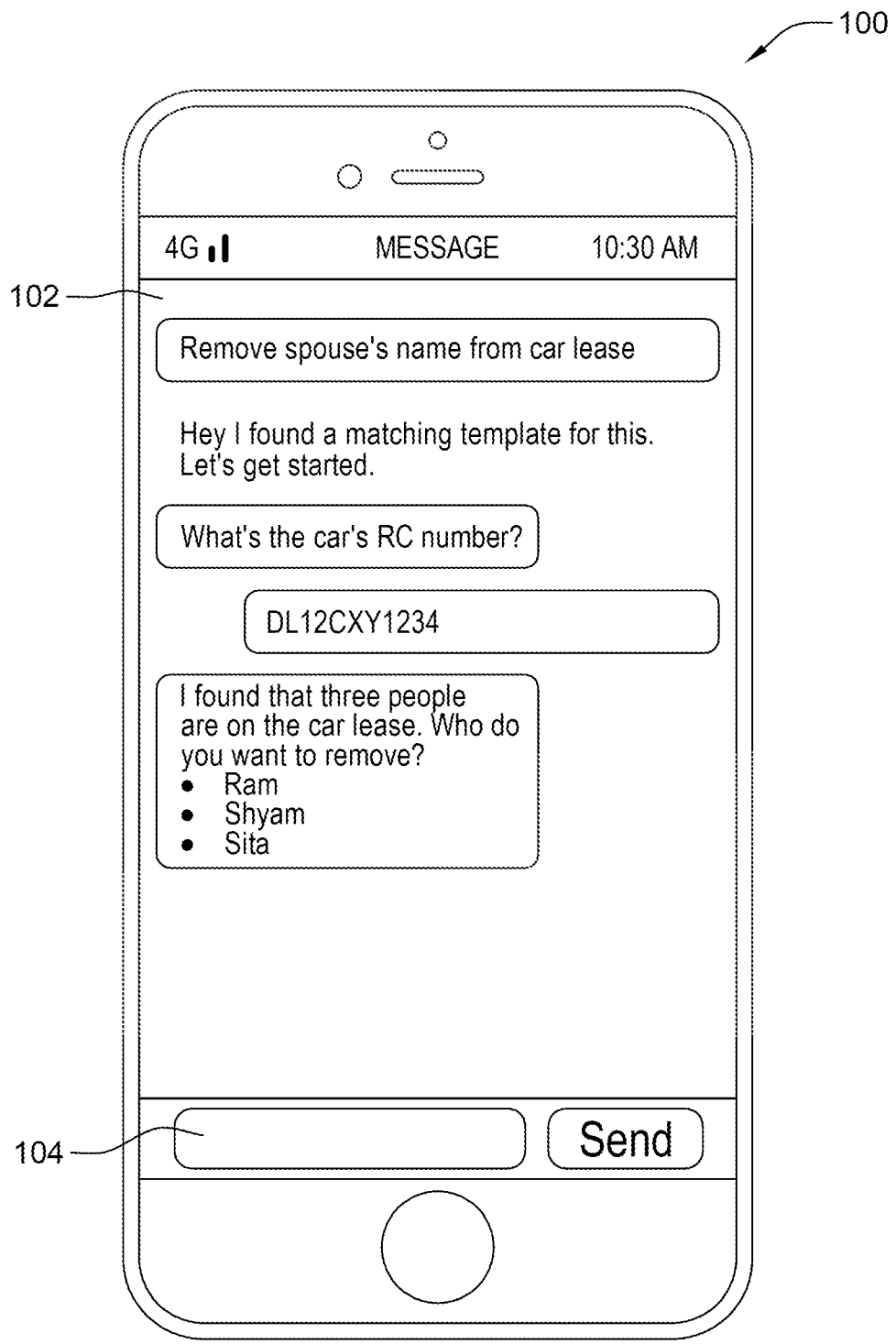

As shown in FIG. 5, GUI 100 displays, in message field 102, a message history as well as information indicating that several names were found to be associated with the car in question. GUI 100 displays, for example, the message "I found that three people are on car's lease. Who do you want to remove? Ram, Shyam, Sita". The manner in which such information is found is described in greater detail in connection with other Figures, below.

Figure 6:
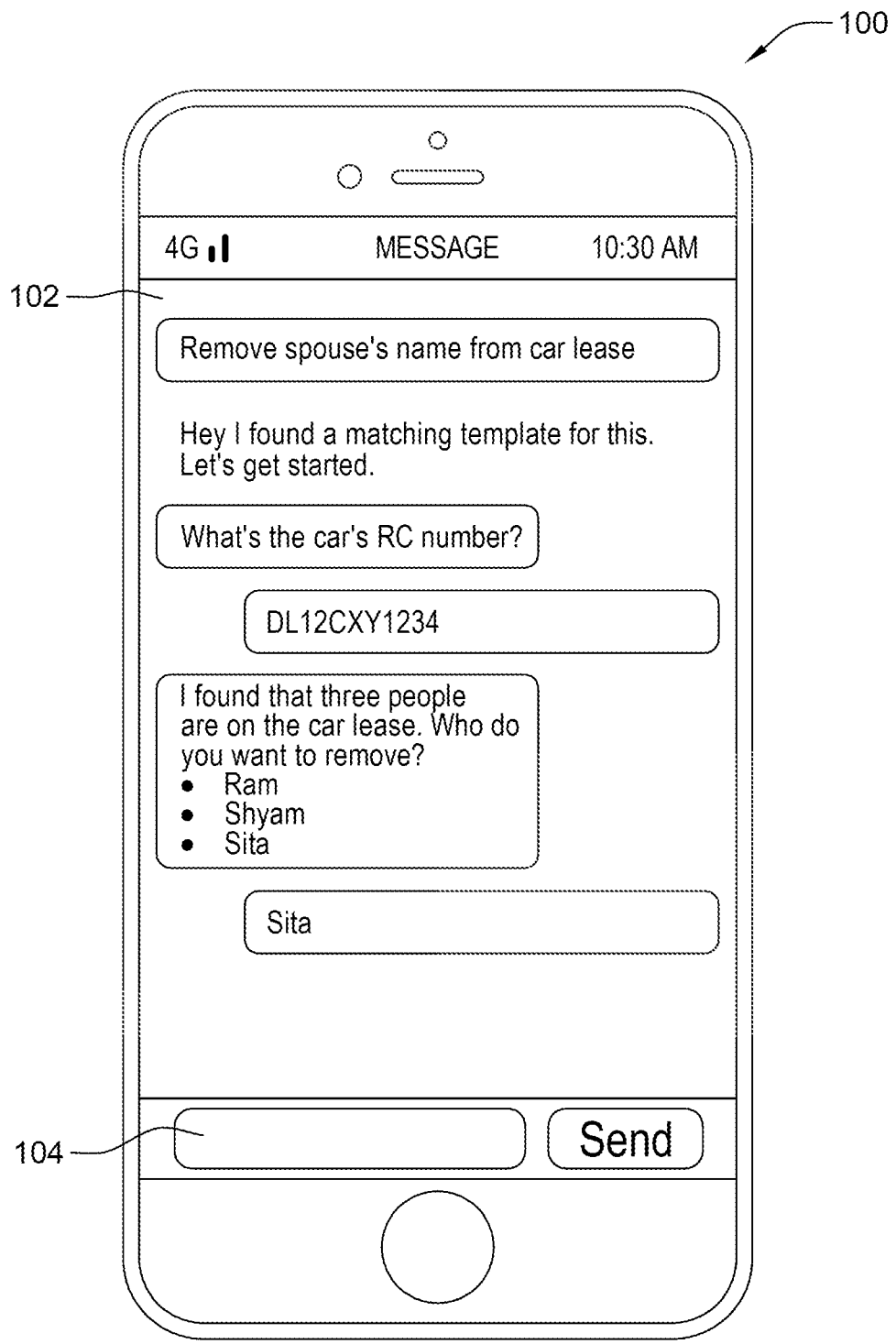

As shown in FIG. 6, GUI 100 displays, in message field 102, a message history as well as information indicating that the user entered "Sita" via input field 104 as the person whose name should be removed from the car lease, in response to a prompt displayed as described in connection with FIG. 5.

Figure 7:
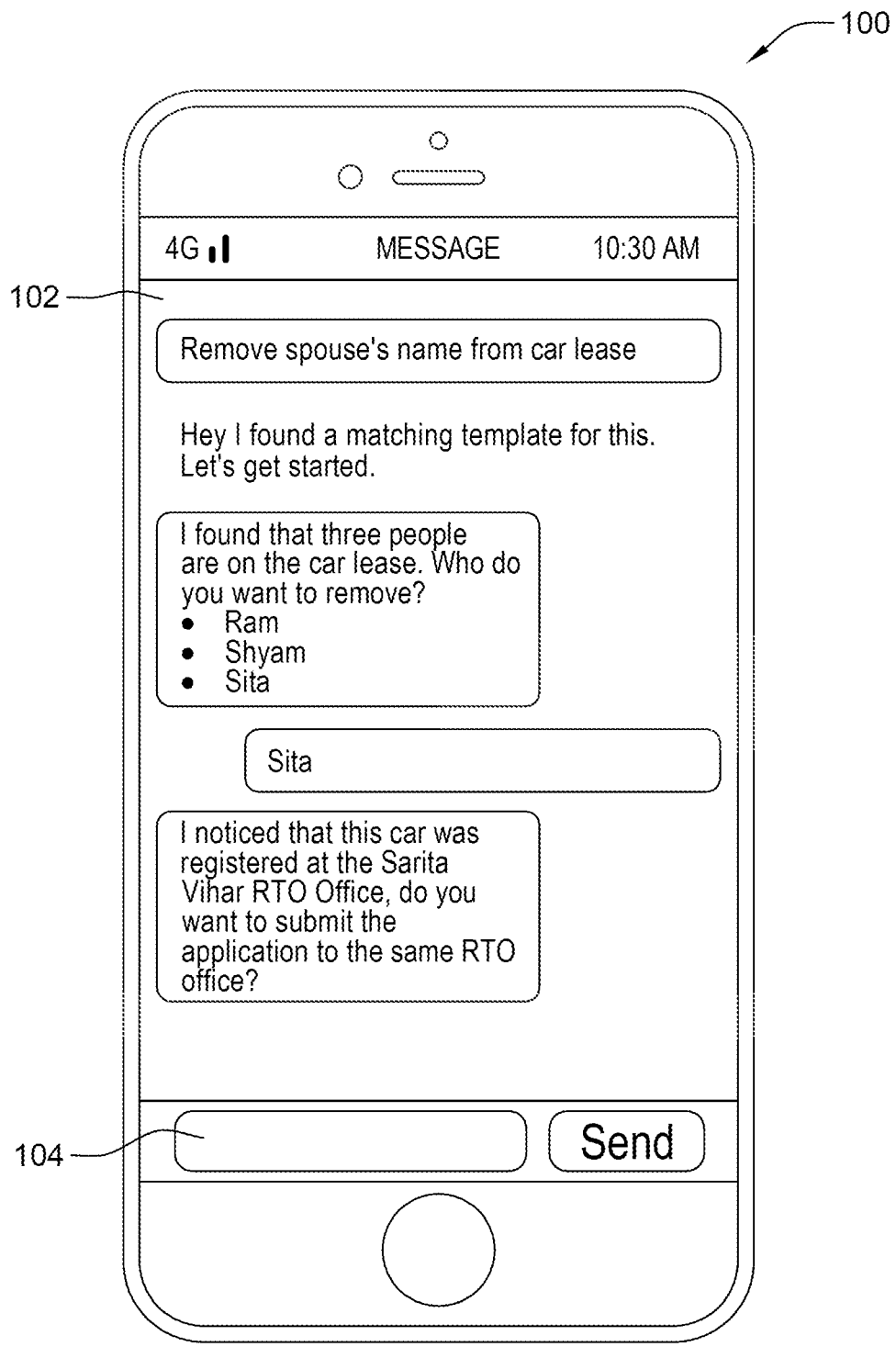

As shown in FIG. 7, GUI 100 displays, in message field 102, a message history as well as information indicating an office to receive the processing application. An associated message reads, for example, "I noticed that this car was registered at the Sarita Vihar RTO Office, do you want to submit the application to same RTO office?" The manner in which such information is found is described in greater detail in connection with other Figures, below.

Figure 8:
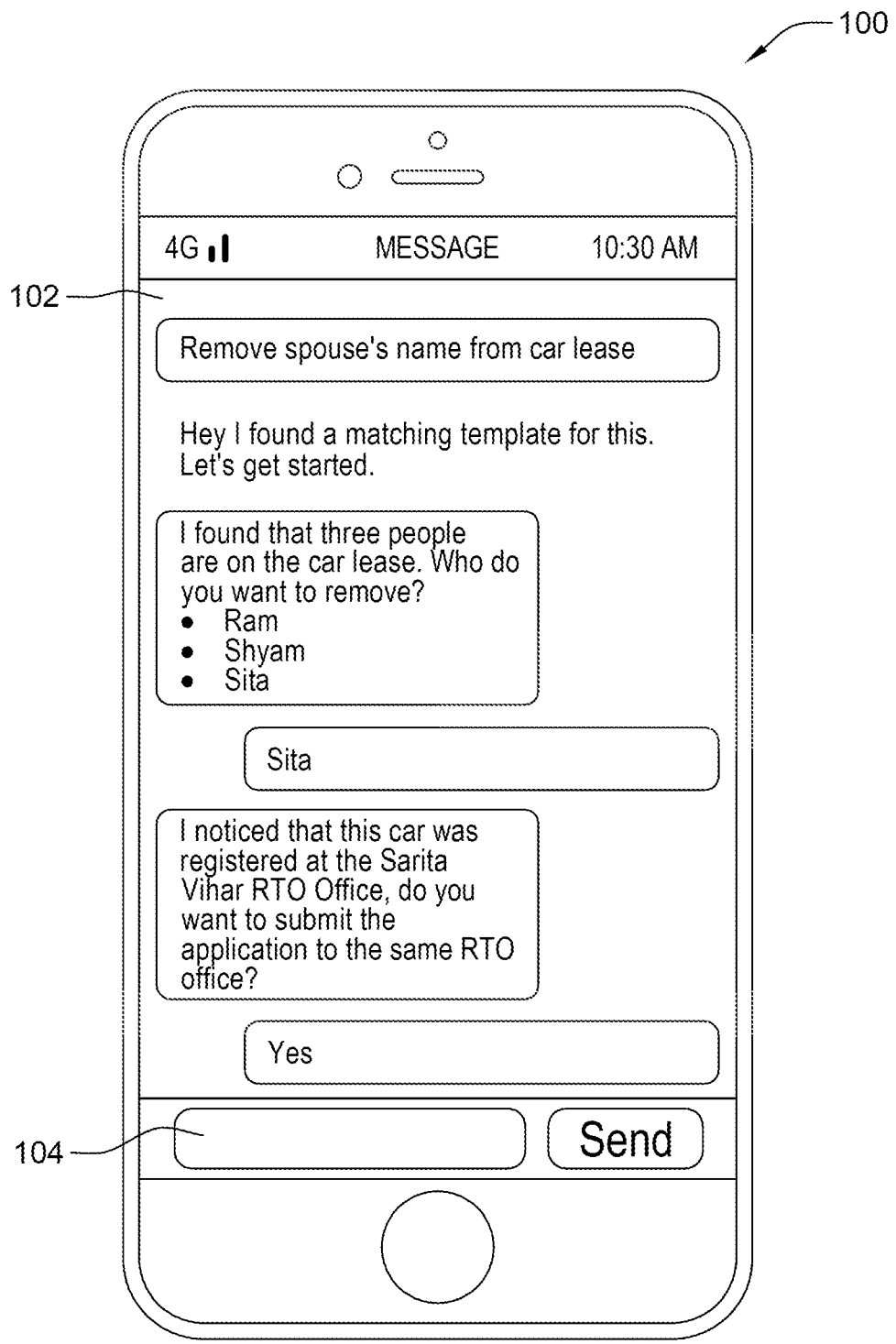

As shown in FIG. 8, GUI 100 displays, in message field 102, a message history as well as information indicating that the user responded "yes" via input field 104 to the input prompt displayed in FIG. 6.

Figure 9:
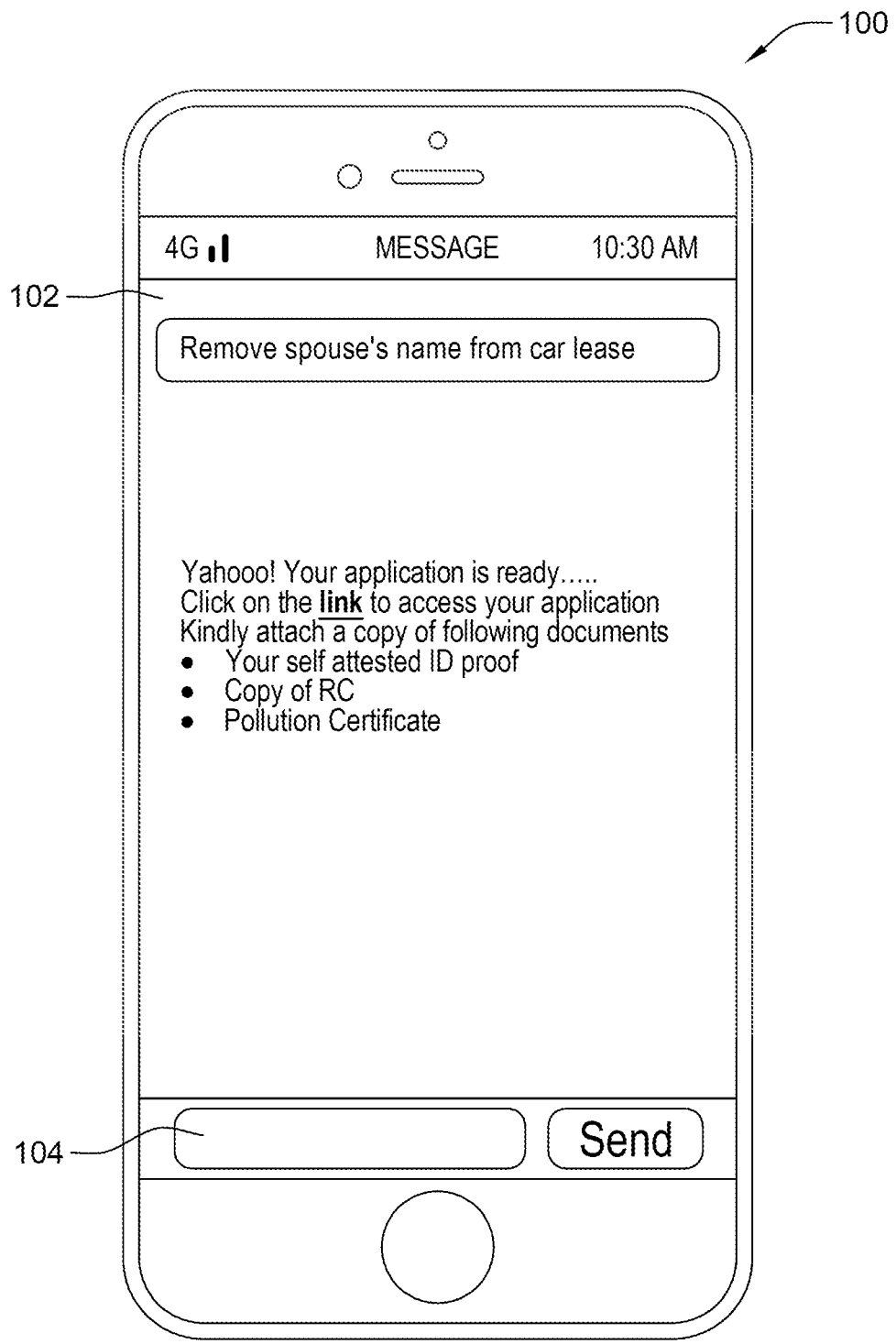
Figure 10:
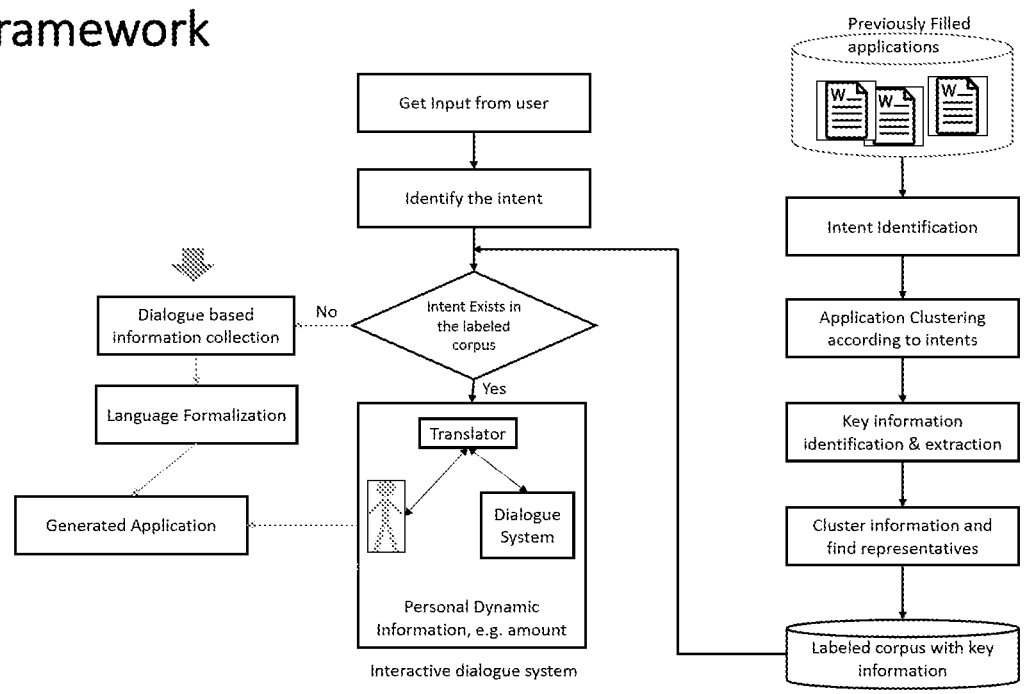
FIG. 10-13 are illustrative flowcharts of operations of a software application, according to embodiments of the invention.

As shown in FIG. 9, GUI 100 displays, in message field 102, the user's intent, and text indicating that a process application has been completed and is ready for submission to a recipient. GUI 100 additionally displays a prompt for additional documents that the user should FIG. 10 provides an illustrative framework 1000 for providing the functions depicted in FIGS. 1-9, above. By this process, user input is received to identify intent, and a process application is generated. The process application may be generated in the background without exposure to the user.

Framework 1000 is deployed on one or more computing systems and can be embodied as programing instructions executable by one or more processors to perform a method. In an embodiment, at least aspects of framework 1000 may be described as a method or as a set of processing stages. At processing stage 1002, framework 1000 receives user input, for example as described in connection with FIGS. 1-9, above. At processing stage 1004, framework 1000 identifies user intent by analyzing the user input. At processing stage 1006, framework 1000 determines whether the intent already exists in a labeled intent corpus. If the intent already exists (Yes branch), framework 1000 engages an interactive dialogue system 1007 (e.g., a chat bot), optionally with a translator module, to provide personal dynamic information exchange with the user as described in connection with FIGS. 1-9, above.

If the intent does not already exist (No branch), framework 1000 engages the user via a dialogue-based information collection stage 1008 (i.e., it engages with the user to determine the user's intent) and a language formalization stage 1010. Upon completion of either the Yes or No branches, framework 1000 generates a completed process application at the generated application stage 1012. The generated application may also be referred to as an information intake form.

In determining whether an intent already exists in a labeled corpus at processing stage 1004, framework 1000 consults a labeled corpus 1014 that stores key information. The corpus can be built and continuously updated using a set of processing stages using a set of previously filled process applications 1016. Natural language processing is performed on the previously filled process applications 1016 at intent identification stage 1018. Based on the identified intents, the previously filled process applications are clustered at processing stage 1020. Key information is identified and extracted from the clustered sets at processing stage 1022. Key information refers to information necessary to complete the task associated with the process application. The identified information is clustered and representative process applications are identified in processing stage 1024. This data set is fed into labeled corpus 1016.

Figure 11:
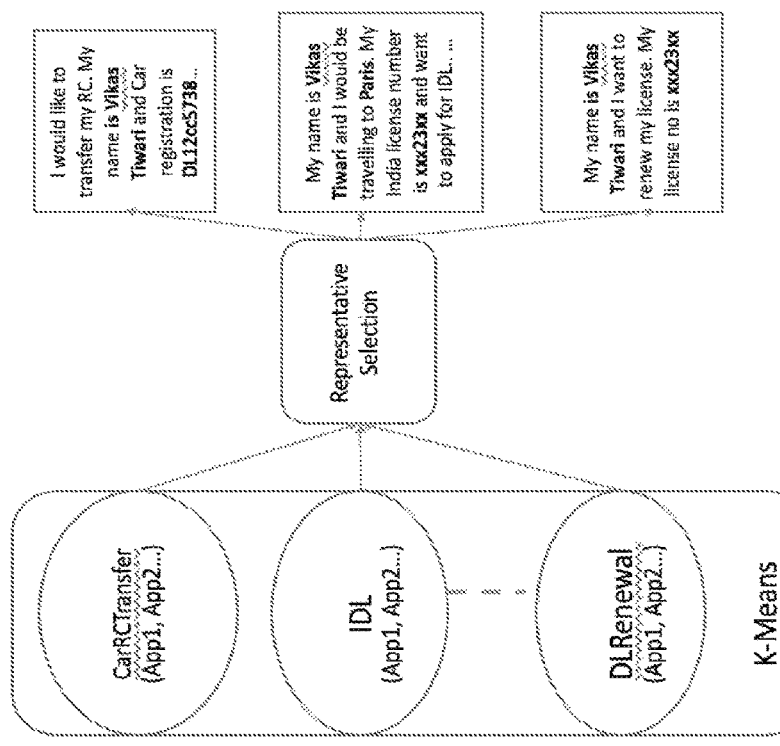
Figure 11:
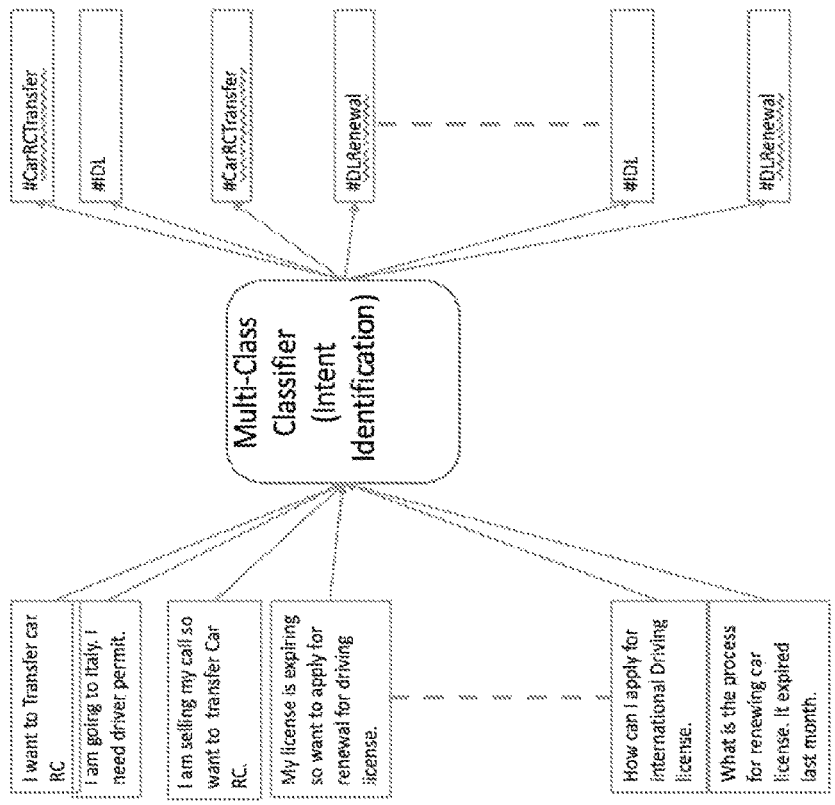

FIG. 11 provides an illustrative process 1100 for providing the functions depicted in FIGS. 1-10, above. More specifically, process 1100 provides intent classification to determine what outputs or processing the user expects from the processing application to be generated, such as those described in connection with FIG. 10 at processing stage 1004 or processing stage 1018. Several example inputs 1102 are provided:

"I want to transfer car RC"
"I am going to Italy. I need a driving permit"
"I am selling my car so I want to transfer the car's RC"
"my license is expiring so I want to renew my license"
"how can I apply for an international driving license?"
"What is the process for renewing a car license? It expired last month"

These expressions of intent are fed into a multiclass classifier 1104 for intent identification. The classifier generates corresponding intents 1106, represented as follows in the illustrated example:

CarRCTransfer
IDL
CarRCTransfer
DLRenewal
IDL
DLRenewal

As can be seen in FIG. 11, multiple process applications have yielded the same intent event though they have not used the exact same words. Accordingly, the labeled intents are clustered, using, for example, K-means clustering 1108. In the illustrated example, the following clusters are generated:

CarRCTransfer (App1, App2 . . . )
IDL (App1, App2 . . . )
DLRenewal (App1, App2 . . . )

Representative process applications are selected for each cluster by a representative selection stage 1110. For example, corresponding selected process applications 1112 for each of the generated clusters may be:

"I would like to transfer my RC. My name is Vikas Tiwari and Car registration is DL12cc5738 . . . "
"My name is Vikas Tiwari and I would be travelling to Paris. My India license number is xxx23xx and want to apply for IDL."
"My name is Vikas Tiwari and I want to renew my license. My license no is xxx23xx . . . "

Figure 12:
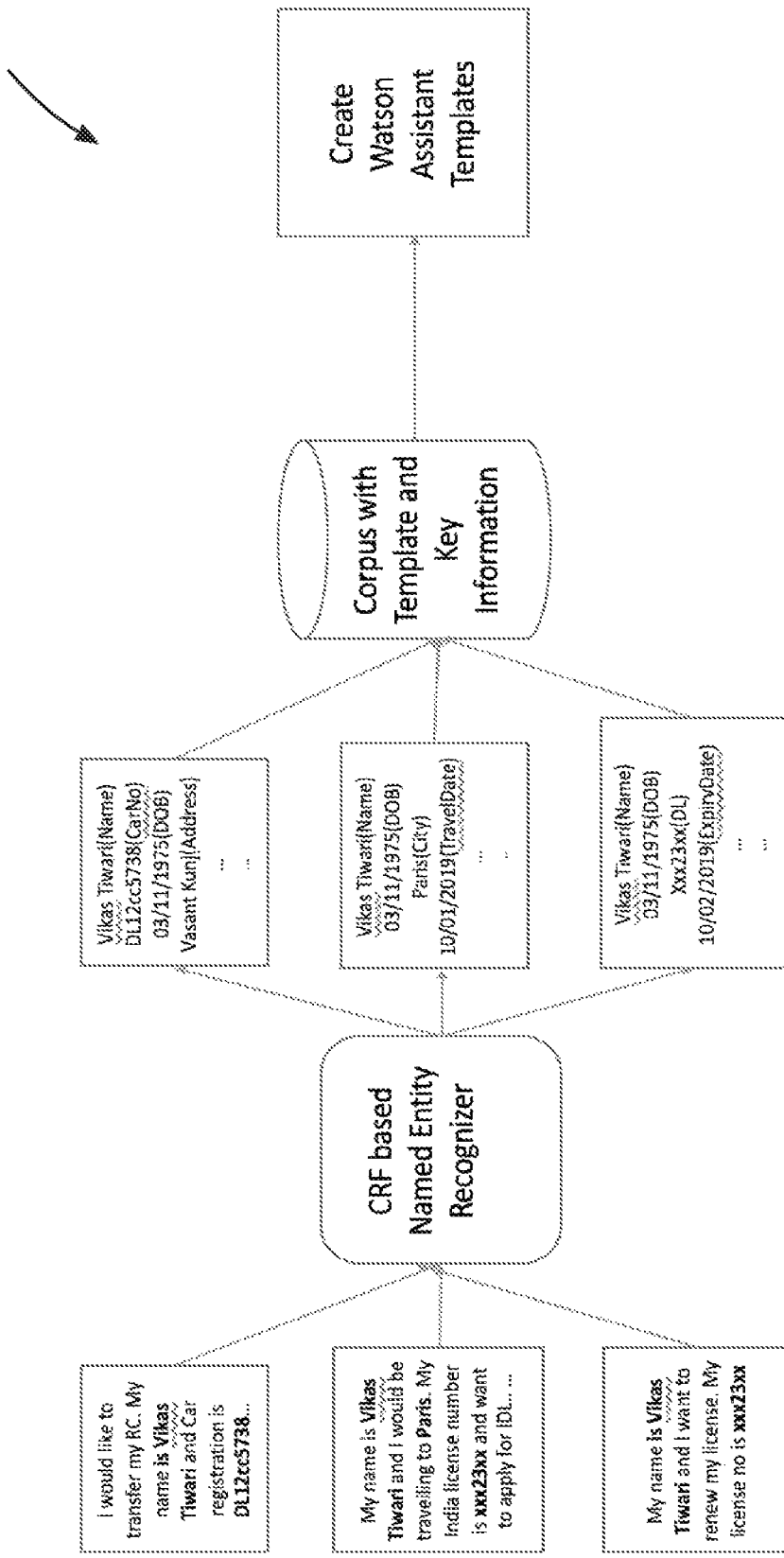

FIG. 12 provides an illustrative process 1200 for providing the functions depicted in FIGS. 1-9, above. More specifically, process 1200 provides functions to build or retrieve process application templates to use for process application generation.

Process 1200 takes the following exemplary inputs 1202:
"I would like to transfer my RC. My name is Vikas Tiwari and Car registration is DL12cc5738 . . . "
"My name is Vikas Tiwari and I would be travelling to Paris. My India license number is xxx23xx and want to apply for IDL . . . "
"My name is Vikas Tiwari and I want to renew my license. My license no is xxx23xx"

The inputs are provided to a CRF-based named entity recognizer 1204 that extracts the bolded text (bolded for emphasis; the input likely will not indicate the bolding) as named entities. The named entity recognizer may generate the following lists 1206 of entities based on its input:

Vikas Tiwari(Name), DL12cc5738(CarNo), 03/11/1975 (DOB), Vasant Kunj(Address) . . .
Vikas Tiwari(Name), 03/11/1975(DOB), Paris(City), 10/01/2019(TravelDate) . . .
Vikas Tiwari(Name), 03/11/1975(DOB), Xxx23xx(DL), 10/02/2019(ExpiryDate) . . .

The named entities may be stored in a corpus 1208 with templates and key information from which additional templates can be generated.

Figure 13:
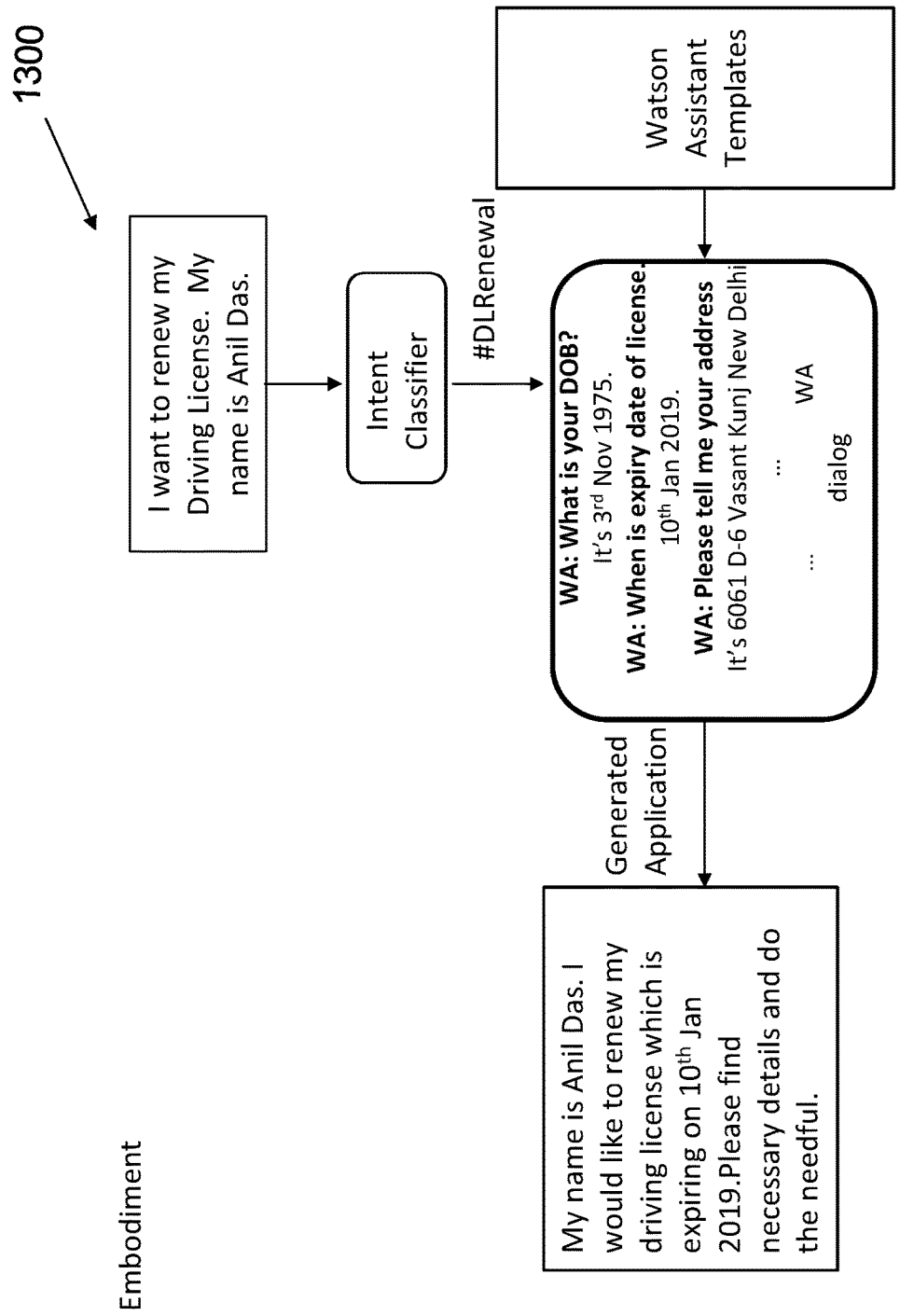

FIG. 13 provides an illustrative process 1300 for providing the functions depicted in FIGS. 1-12, above. More specifically, process 1300 provides functions to build or retrieve application templates to use for software application generation.

Process 1300 receives an input at stage 1302 from a user (an applicant) that reads: "I want to renew my Driving Licensee. My name is Anil Das." Process 1300 performs intent classification at processing stage 1304 and identifies the intent as #DLRenewal. Based on a template associated with this intent, process 1300 asks, via a dialogue stage 1306, the user for the user's date of birth, driver's license expiration date, and address. Process 1300 generates a process application at processing stage 1308 that reads "My name is Anil Das. I would like to renew my driving license which is expiring on $10^{th}$ Jan 2019. Please find necessary details and do the needful."

Figure 14:
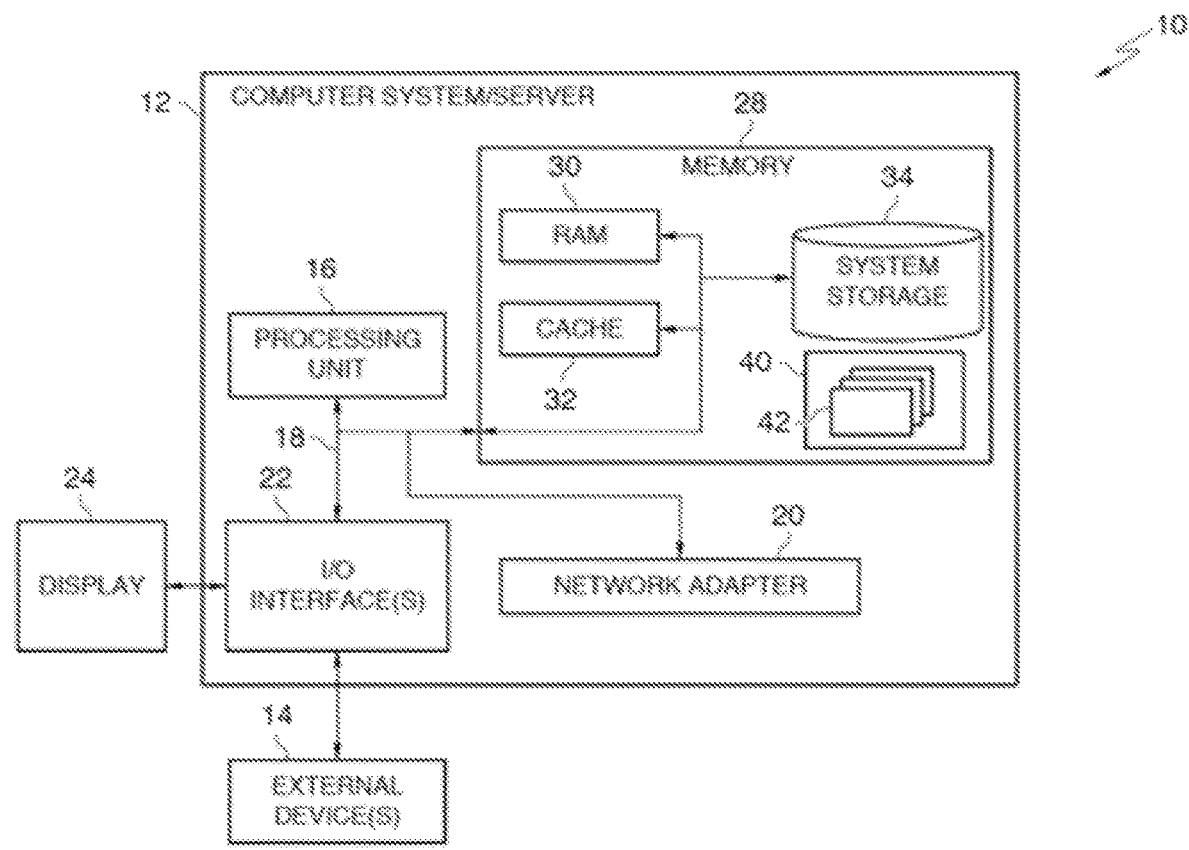
FIG. 14 is a functional block diagram of a computing system or cloud computing node, according to an embodiment of the invention.

FIG. 14 is a block diagram of an illustrative cloud computing node, according to an embodiment of the invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove (for example, in connection with FIGS. 1-13, above).

In cloud computing node 10 there is a computer system/server 12, which is operational with numerous other computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 12 in cloud computing node 10 is shown in the form of a computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 15:
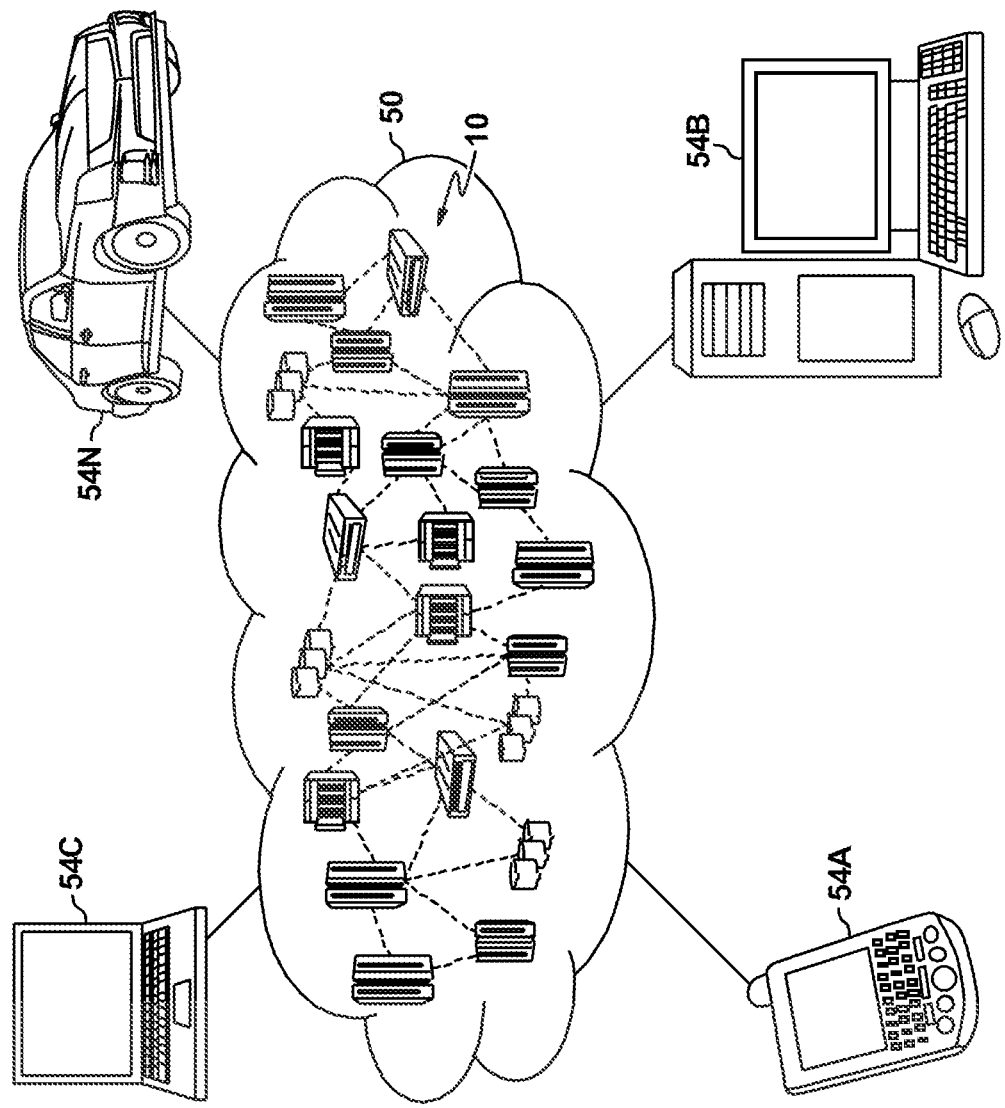
FIG. 15 is a functional block diagram of a cloud computing environment including the computing system or cloud computing node of FIG. 14, according to an embodiment of the invention.
Figure 16:
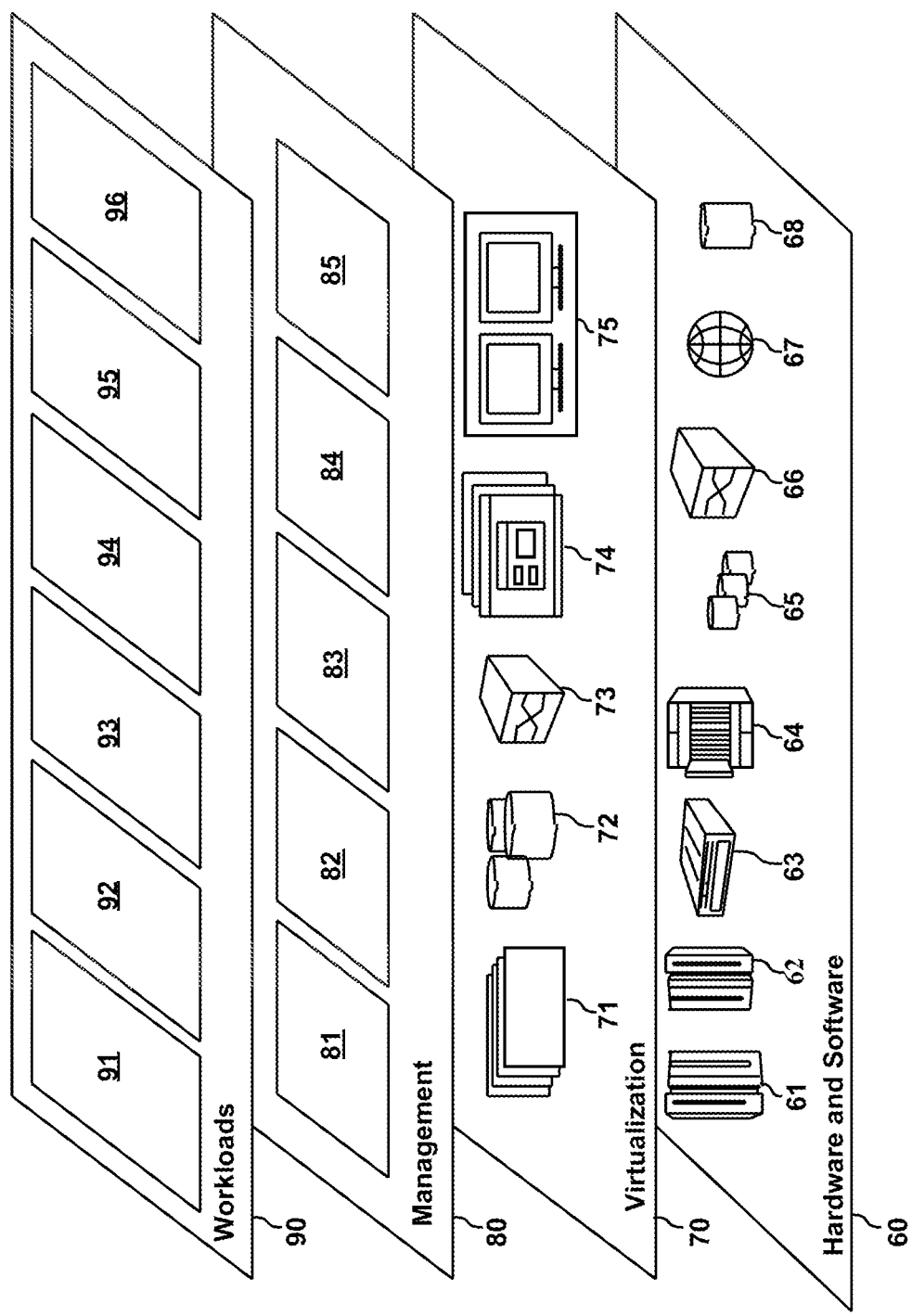
FIG. 16 is a functional block diagram of functional layers of the cloud computing environment of FIG. 15, according to an embodiment of the invention.

FIG. 16 is a block diagram of a cloud computing environment including the cloud computing node of FIG. 14, according to an embodiment of the invention. Referring now to FIG. 15, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

FIG. 16 is a block diagram of functional layers of the cloud computing environment of FIG. 15, according to an embodiment of the invention. Referring now to FIG. 16, a set of functional abstraction layers provided by cloud computing environment 50 is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; process application generation and information intake form generation 96, including those described in connection with FIGS. 1-13, above.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:

receiving, via a graphical user interface (GUI), a natural language statement specifying an intent to perform an action;

performing, by multiclass classifier, intent identification on the received natural language statement, wherein the multiclass classifier identifies the intent as belonging to a cluster of similar intents in a corpus of intents, wherein the corpus of intents is clustered by key information, the key information being information necessary to complete the task associated with an application associated with the cluster of similar intents;

based on the identified intent existing in the corpus of intents, retrieving and executing the application associated with the cluster of similar intents; and based on the identified intent not existing in the corpus of intents, receiving from the GUI information to generate an application;

associating the generated application with the identified intent;

creating a new cluster comprising the associated generated application, the key information, and the identified intent;

executing the associated generated application; and storing the new cluster in the corpus of intents.

2. A computer program, comprising one or more tangible storage media storing one or more programming instructions for execution by one or more processors of one or more computers to perform a method, the programming instructions comprising instructions for:

receiving, via a graphical user interface (GUI), a natural language statement specifying an intent to perform an action;

performing, by multiclass classifier, intent identification on the received natural language statement, wherein the multiclass classifier identifies the intent as belonging to a cluster of similar intents in a corpus of intents, wherein the corpus of intents is clustered by key information, the key information being information necessary to complete the task associated with an application associated with the cluster of similar intents;

based on the identified intent existing in the corpus of intents, retrieving and executing an application associated with the cluster of similar intents; and based on the identified intent not existing in the corpus of intents, receiving from the GUI information to generate an application;

associating the generated application with the identified intent;

creating a new cluster comprising the associated generated application, the key information, and the identified intent;

executing the associated generated application; and storing the new cluster in the corpus of intents.

3. A computer, comprising:

one or more processors;

one or more tangible storage media storing programing instructions for execution by the one or more processors to perform a method, the programming instructions comprising instructions for:

receiving, via a graphical user interface (GUI), a natural language statement specifying an intent to perform an action;

performing, by multiclass classifier, intent identification on the received natural language statement, wherein the multiclass classifier identifies the intent as belonging to a cluster of similar intents in a corpus of intents, wherein the corpus of intents is clustered by key information, the key information being information necessary to complete the task associated with an application associated with the cluster of similar intents;

based on the identified intent existing in the corpus of intents, retrieving and executing an application associated with the cluster of similar intents; and based on the identified intent not existing in the corpus of intents, receiving from the GUI information to generate an application;

associating the generated application with the identified intent;

creating a new cluster comprising the associated generated application, the key information, and the identified intent;

executing the associated generated application; and storing the new cluster in the corpus of intents.

* * * * *